(12) United States Patent
Fellenstein et al.

(10) Patent No.: US 7,260,743 B2
(45) Date of Patent: Aug. 21, 2007

(54) SYSTEM AND METHOD FOR ACHIEVING AUTONOMIC COMPUTING SELF-HEALING, UTILIZING META LEVEL REFLECTION AND REASONING

(75) Inventors: Craig William Fellenstein, Brookfield, CT (US); Carl Phillip Gusler, Austin, TX (US); Rick Allen Hamilton, II, Charlottesville, VA (US); Mamdouh Ibrahim, Rochester Hills, MI (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 10/756,143

(22) Filed: Jan. 13, 2004

(65) Prior Publication Data

US 2005/0188285 A1    Aug. 25, 2005

(51) Int. Cl.
*G06F 11/00* (2006.01)
(52) U.S. Cl. ....................................................... 714/26
(58) Field of Classification Search .................. 714/26
See application file for complete search history.

(56) References Cited

U.S. PATENT DOCUMENTS

| | | | |
|---|---|---|---|
| 4,034,194 A | 7/1977 | Thomas et al. | |
| 4,322,846 A | 3/1982 | Carroll et al. | |
| 5,107,500 A | 4/1992 | Wakamoto et al. | |
| 5,127,005 A | 6/1992 | Oda et al. | |
| 5,161,158 A | 11/1992 | Chakravarty et al. | |
| 5,170,480 A | 12/1992 | Mohan et al. | |
| 5,331,476 A | 7/1994 | Fry et al. | |
| 5,388,252 A | 2/1995 | Dreste et al. | |
| 5,404,503 A * | 4/1995 | Hill et al. ...................... | 714/31 |
| 5,423,025 A | 6/1995 | Goldman et al. | |
| 5,448,722 A * | 9/1995 | Lynne et al. .................. | 706/49 |
| 5,539,877 A | 7/1996 | Winokur et al. | |
| 5,602,990 A * | 2/1997 | Leete ........................... | 714/46 |
| 5,768,499 A | 6/1998 | Treadway et al. | |
| 5,771,240 A | 6/1998 | Tobin et al. | |

(Continued)

FOREIGN PATENT DOCUMENTS

EP    0897151 A1    2/1999

(Continued)

OTHER PUBLICATIONS

Horstmann et al., "Core Java 2", vol. 1, Chapter 11, 2001, pp. 635-691.

(Continued)

*Primary Examiner*—Robert Beausoliel
*Assistant Examiner*—Amine Riad
(74) *Attorney, Agent, or Firm*—Stephen R. Tkacs; Stephen J. Walder, Jr.; David A. Mims, Jr.

(57) ABSTRACT

A mechanism is provided for achieving autonomic computing self-healing utilizing meta level reflection. In a base level, a monitor detects an error in a production environment. The base level provides a reification message comprising data about the error to a meta level. A reasoning system in the meta level receives the reification message and analyzes the data using knowledge of computational components in the base level. The reasoning system identifies a self-healing action for the error and returns a reversion message comprising a signal to implement the self-healing action. Responsive to receiving the signal, the base level implements the self-healing action.

16 Claims, 3 Drawing Sheets

U.S. PATENT DOCUMENTS

| | | | |
|---|---|---|---|
| 5,862,322 A | 1/1999 | Anglin et al. | |
| 5,956,714 A | 9/1999 | Condon | |
| 5,978,594 A | 11/1999 | Bonnell et al. | |
| 5,983,364 A * | 11/1999 | Bortcosh et al. | 714/25 |
| 6,006,016 A * | 12/1999 | Faigon et al. | 714/48 |
| 6,028,593 A | 2/2000 | Rosenberg et al. | |
| 6,085,335 A * | 7/2000 | Djoko et al. | 714/26 |
| 6,105,067 A | 8/2000 | Batra | |
| 6,134,676 A | 10/2000 | VanHuben et al. | |
| 6,170,067 B1 * | 1/2001 | Liu et al. | 714/48 |
| 6,182,086 B1 | 1/2001 | Lomet et al. | |
| 6,249,755 B1 | 6/2001 | Yemini et al. | |
| 6,343,236 B1 | 1/2002 | Gibson et al. | |
| 6,363,497 B1 | 3/2002 | Chrabaszcz | |
| 6,442,694 B1 | 8/2002 | Bergman et al. | |
| 6,532,552 B1 * | 3/2003 | Benignus et al. | 714/25 |
| 6,574,744 B1 | 6/2003 | Kantz et al. | |
| 6,615,367 B1 | 9/2003 | Unkle et al. | |
| 6,681,344 B1 | 1/2004 | Andrew | |
| 6,708,333 B1 * | 3/2004 | Glerum et al. | 717/171 |
| 6,738,928 B1 | 5/2004 | Brown | |
| 6,742,141 B1 | 5/2004 | Miller | |
| 6,779,132 B2 | 8/2004 | Andress et al. | |
| 6,789,257 B1 * | 9/2004 | MacPhail | 719/316 |
| 6,845,469 B2 | 1/2005 | Hicks et al. | |
| 6,845,474 B2 | 1/2005 | Circenis et al. | |
| 6,865,696 B2 | 3/2005 | Lopke | |
| 7,007,200 B2 * | 2/2006 | Salem | 714/26 |
| 7,080,141 B1 * | 7/2006 | Baekelmans et al. | 709/224 |
| 7,194,445 B2 | 3/2007 | Chan et al. | |
| 2002/0144187 A1 | 10/2002 | Morgan et al. | |
| 2002/0191536 A1 | 12/2002 | LaForge et al. | |

FOREIGN PATENT DOCUMENTS

| | | |
|---|---|---|
| JP | 4065729 A | 3/1992 |
| WO | WO0068793 A1 | 11/2000 |

OTHER PUBLICATIONS

Crandall, D. R. and Lindeman, D. F., "Self-Initiating Diagnostic Program Loader from Failed Initial Program Load I/O Device," reproduced from Research Disclosure, Jun. 1991, No. 326, Kenneth Mason Publications Ltd, England.

J. P. Bigus et al., "ABLE: A Toolkit For Building Multiagent Autonomic Systems," *IBM Systems Journal*, vol. 41, No. 3, p. 350 (2002).

IBM Corporation, "alphaWorks web page: Agent Building and Learning Environment," available at http://www.alphaWorks.ibm.com/tech/able, accessed Oct. 15, 2003.

IBM Corporation, *An Architectural Blueprint For Autonomic Computing*, (2003), available at http://www.ibm.com/autonomic/pdfs/ACwpFinal.pdf, accessed Sep. 25, 2003.

U.S. Appl. No. 10/195,181, filed Jul. 11, 2002, Salem.
U.S. Appl. No. 10/195,182, filed Jul. 11, 2002, Salem.
U.S. Appl. No. 10/290,212, filed Nov. 7, 2002, Apte.
U.S. Appl. No. 10/210,361, filed Jul. 31, 2002, Salem.

* cited by examiner

SYSTEM AND METHOD FOR ACHIEVING AUTONOMIC COMPUTING SELF-HEALING, UTILIZING META LEVEL REFLECTION AND REASONING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to information handling, and more particularly to error handling, recovery, and problem solving, for software and information-handling systems.

BACKGROUND OF THE INVENTION

Various approaches have been proposed for handling errors or failures in computers. In some examples, error-handling is not separated from hardware. In other examples, the complexity of automated problem-solving is not addressed.

It is very difficult, with the current state of the art in computing, for a system or application experiencing an error to automatically examine possible recovery approaches, and select a recovery approach. It is very complex for the programmer to deal with an error in the same space utilized by the application experiencing the error.

Thus there is a need for methods and systems that reduce to a manageable level the complexity of automated error handling, recovery, problem-solving.

SUMMARY OF THE INVENTION

An example of a solution to problems mentioned above comprises:
under control of a base level,
   detecting an error in a production environment; and
   providing data about the error to a meta level;
under control of the meta level,
   analyzing the data, using knowledge of base-level computational components;
   choosing a solution for the error; and
   implementing the solution at the base level.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

The examples that follow involve the use of one or more computers and may involve the use of one or more communications networks. The present invention is not limited as to the type of computer on which it runs, and not limited as to the type of network used. The following are definitions of terms used in the description of the present invention and in the claims:

"Application" means any specific use for computer technology, or any software that allows a specific use for computer technology.

"Base level" means any computational space in which computation is done in a production environment.

"Component" or "computational component" means any element or part, and may include elements consisting of hardware or software or both.

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Error" means any event or occurrence that may be unexpected, undesirable, or incorrect.

"Having a self-healing capability:" includes, but is not limited to, a capability for automated problem-solving or automated recovery from an error.

"Meta level" means any computational space that is utilized for computation concerning behavior of base-level computational components. A meta level may be a logical concept, or a computational space separate from a base level.

"Production environment" means any set of actual working conditions, where daily work or transactions take place.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

Figure 1:
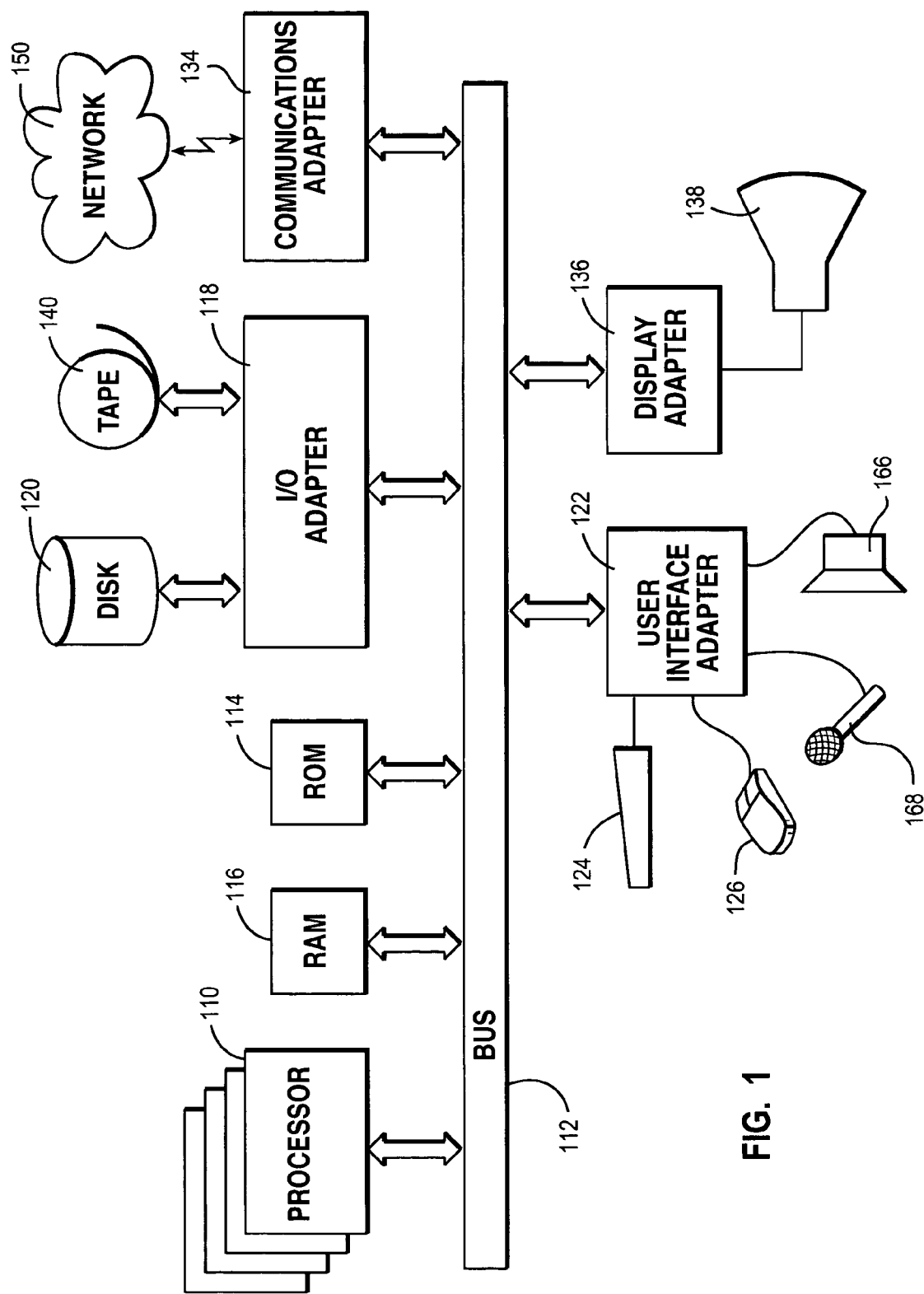
FIG. 1 illustrates a simplified example of a computer system capable of performing the present invention.

FIG. 1 illustrates a simplified example of an information handling system that may be used to practice the present invention. The invention may be implemented on a variety of hardware platforms, including embedded systems, personal computers, workstations, servers, and mainframes. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a communications network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
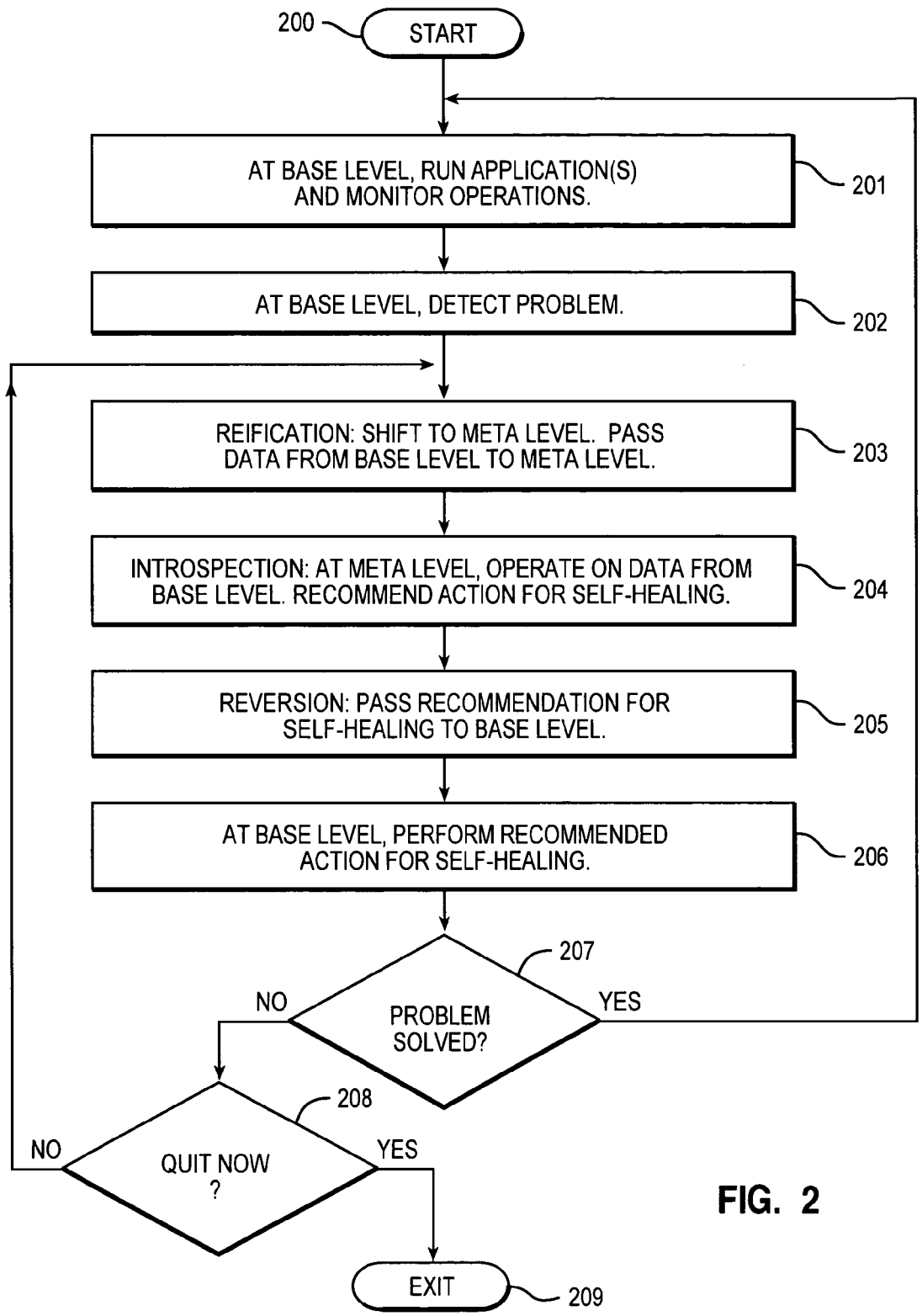
FIG. 2 is a flow chart illustrating an example of a method of handling errors, according to the teachings of the present invention.

FIG. 2 is a flow chart illustrating an example of a method of handling errors. To begin with an overview, the example involves operations at a base level (blocks 201-202) and continues with a reflective mode involving a meta level and reversion to the base level (blocks 203-205). The example involves, at base level, starting and running applications along with a monitoring process (200-201), detecting an error in a production environment (202), and continues with performing reification to a meta level (passing information about this specific error, and about base level computational components and their status, to a meta level, 203). The example continues with performing introspection at the meta level, in response to reification (204), performing reversion to the base level, based upon results of the introspection (passing a recommendation for self-healing, 205), and implementing at the base level a solution for the error (action for self-healing, 206).

At decision 207, if the problem is now solved, then the "YES" branch is taken back to 201 (to continue base computation). On the other hand, if the problem is not solved, then the "NO" branch is taken to decision 208 ("quit now?"). If the self-healing process is to continue, then the "NO" branch is taken from decision 208 back to the reification operation (203) with new data, if available. If the self-healing process is to terminate, then the "YES" branch is taken from decision 208, to exit at block 209.

Continuing with details of FIG. 2, employing a base level comprises detecting an error in the production environment (block 202), and in response to the error, invoking the self-healing capability (reification, block 203). Employing a meta level comprises gathering data concerning an error in the production environment, and choosing a solution for the error (introspection, block 204). Employing a meta level comprises implementing the solution by influencing the base-level computational components (reversion, block 205). The base level and the meta level may be implemented on the same computer (the same physical level), or on separate computers. Both the base level and the meta level may be implemented on a number of computers.

Continuing with some details of the example in FIG. 2, a self-healing system preferably is equipped with a monitoring mechanism to detect errors at block 202. Monitoring preferably is an ongoing activity at a base level, block 201. To invoke the reification process, at block 203, a triggering mechanism may use existing features of the application programming language, such as exception-handling mechanisms. The "throw" and "catch" exception handling in JAVA is one example. Regarding the problem detection at block 202, monitoring agents in a multi-platform system could be part of the operating systems running on the base level machines, or could be implemented as an external application, running on a separate machine.

When reification is invoked at block 203, a monitoring agent collects information about the state of the computation or the state of the machine. The information collected is bundled in a reification message that is sent to the meta level. At 204, an introspection application on the meta level may be running all the time, or may be invoked when the reification message is received. The introspection application on the meta level takes the information passed by the reification message, and uses knowledge about the base-level components, such as application components, or systems and their relationship with the machine experiencing the problem.

At block 204, the introspection process examines the base level application and decides on the best solution, given the current state of the computation at base level. A rule-based system reasons at 204 about the state of the base computation. For example, the introspection process determines that the current data base is not accessible, but determines that an alternative database is available, and reaches a conclusion that the preferred action for self-healing is to connect to the alternative database. The introspection process can be implemented as an expert system, based on rules and knowledge of the base level domain. This expert system will allow the introspection process to work in a stand-alone mode, or in an interactive mode, probing the base level computation domain, or in a consultation mode with a human being.

The introspection process (204) may run on a platform separate from the base level platform, examining the base level domain. The base level may be comprised of several machines, each with its own operating system and applications. The introspection in this case examines this state of these machines in relation to the other machines involved in this reflective scope. Again this introspection could be implemented by an expert system where its domain this time is the base level machines, their running tasks, and other platform attributes.

When the introspection process at block 204 reaches a conclusion, the meta level initiates the reversion process, block 205, which influences the running applications or the problem machine. For example an expert system utilized to implement the introspection process at block 204 uses the action side of the rules to invoke the reversion process at block 205, allowing manipulation (block 206) of the base level components that are the subject of introspection. At block 205, a reversion message is passed to the base level, carrying a recommendation (instructions) for self-healing and a signal to implement the solution. The reification message at 203 and the reversion message at 205 may take the form of a request and response via hypertext transfer protocol (HTTP), or some other protocol may be used. For example, the reversion message at 205 instructs the base level application to access an alternative database. The reversion message includes instructions for obtaining a connection to the alternative database, and a signal to a resource manager to utilize the alternative data source. After successfully connecting to the alternative database (at 206), the base-level computation continues. In other examples, implementing the solution may comprise one or more actions such as managing memory, terminating an application that is experiencing an error, and starting an application that may be used during recovery. After a successful self-healing action at 206, the base-level computation continues, symbolized by the "Yes" branch from decision 207 back to block 201.

Regarding FIG. 2, the order of the operations described above may be varied. For example, additional data collection (probing the base level computation domain), or operation in a consultation mode with a human being, are within the practice of the invention. Blocks in FIG. 2 could be arranged in a somewhat different order, but still describe the invention. Blocks could be added to the above-mentioned diagram to describe details, or optional features; some blocks could be subtracted to show a simplified example.

Figure 3:
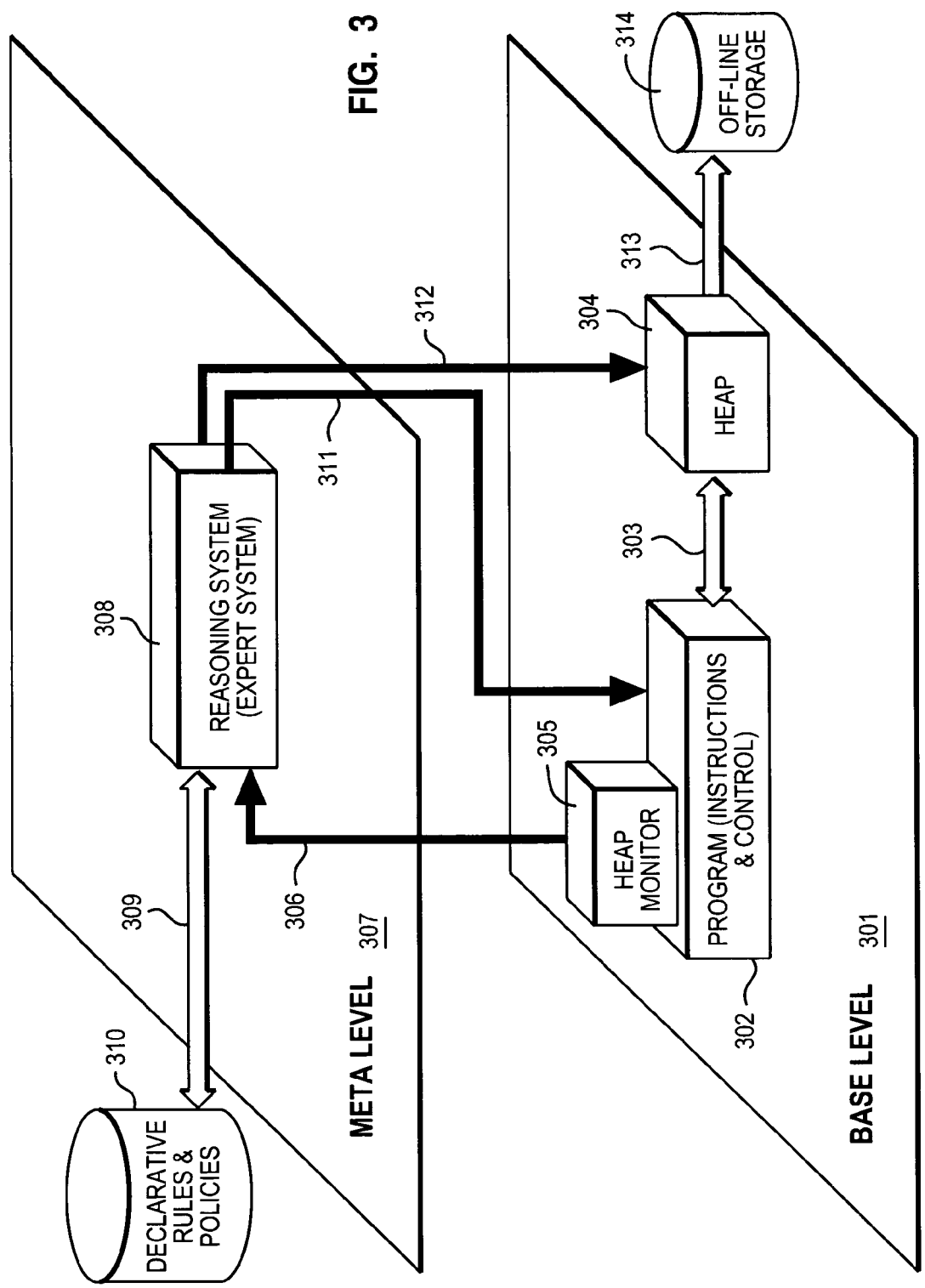
FIG. 3 is a block diagram illustrating an example of a system and method of handling errors, according to the teachings of the present invention.

FIG. 3 is a block diagram illustrating an example of a system and method of handling errors. To begin with an architect's point of view, assume that an object-oriented application (program 302) is to be developed, for which a large amount of data must be retrieved and encapsulated as objects in memory. A memory heap (304) is allocated for the application to create the objects to be manipulated by the application 302. As a starting point, assume that conventional heap management and garbage collection techniques are used to manage the heap 304. If the application 302 needs to retrieve more data than the allocated heap 304 can accommodate, it is conventional for application 302 to throw an exception, indicating that it is out of memory. It is customary that the application 302 reports failure and exits, possibly allowing the user to save his or her work before exiting.

It is very complex for the programmer to deal with such an error in the same space utilized by the application experiencing the error. It is very difficult, with the current state of the art in computing, for a system or application experiencing an error to automatically examine possible recovery approaches, and select a recovery approach.

Next, consider a system or application that is built to take care of its own recovery. FIG. 3 provides an example of a system or application that is built to reason about its own status on a level (the meta level, 307) other than the level on which the conventional computation is taking place (the base level, 301). The example involves providing a base level (301) for computation in a production environment, providing a meta level (307) for computation concerning behavior of base-level computational components (such as 302, 304 and 314), and developing an application (302) having a self-healing capability, employing the base level 301 and the meta level 307.

Thus the example in FIG. 3 involves a separation of concerns that promotes programming of self-healing applications. Computation at base level 301 concerns doing work in a production environment. Computation at meta level 307 concerns reasoning about behavior of applications and computational components (such as program 302, heap 304 and storage 314) at base level 301. Using this approach, programmers may separate the effort of developing the self-healing capability from the effort of developing the base computation.

Next, consider an overview of some operations shown in FIG. 3. The example in FIG. 3 involves, under control of base level 301, detecting an error in a production environment (e.g. heap monitor 305 detects that program 302 is out of memory). The example involves providing data (arrow 306) about the error to meta level 307. This may comprise passing information about the heap 304 to the meta level 307, or merely signaling the status of the error.

The example in FIG. 3 involves, under control of the meta level 307, analyzing (at 308) the data, using knowledge of base-level computational components, choosing a solution for the error, and implementing the solution at the base level 301 (for example, managing memory 304 and utilizing off-line storage 314).

One may also consider operations shown in FIG. 3, utilizing the terminology from the flowchart in FIG. 2. In other words, FIG. 3 involves performing reification (306) to a meta level 307 (i.e. passing information 306 about this specific error, and about base level computational components 302, 304 and 314 and their status, to meta level 307). For example, when a heap problem is detected (e.g., out of memory), the monitor 305 invokes the reification process 306, which shifts the computation to the meta level 307.

FIG. 3 illustrates performing introspection (at 308, on meta level 307), in response to reification 306. For example, performing introspection at 308 may involve gathering data from base level 301 and applying one or more rules (310) to the data (such as applying a rule for control of components 302, 304 and 314 at base level 301). The reasoning system 308, through the process of introspection, can probe the base level 301 to determine the best strategy to resolve the heap problem. For example, the introspection process may ask the operating system for more memory resources. If this is not possible, the introspection process may then examine the objects in the heap 304, and determine whether they are all needed at this time, or if they can be reconstructed. If it determined that all the objects in the heap 304 are still needed, and there is no more physical memory that can be allocated, then the introspection process may conclude that objects in the heap 304 that are not accessed frequently may be stored off line. This is an example of the introspection process working in an interactive mode, probing the base level computation domain. The introspection process may also work in a stand-alone mode, or in a consultation mode with a human being.

FIG. 3 illustrates performing reversion (arrows 311 and 312) to base level 301, based upon results of introspection at 308. For example, reversion may involve passing a recommendation to base level 301, including a signal to implement a solution. The heap 304 or the program 302 can be altered to implement the solution suggested by the reasoning system 308. The reasoning system 308 invokes the reversion process (arrow 311 and arrow 312). The reversion may select (arrow 312) objects in the heap 304 that are not accessed frequently and store them (arrow 313) in off-line storage 314. Also, the program 302 will be notified (arrow 311), so that if the stored objects are needed, then the program 302 can restore the objects from off-line storage 314.

This reversion process and effect are made possible because the introspection (at 308) on the meta level 307 is developed to work with and reason about the base-level components (which in this case are the program 302, the heap 304, and the off-line storage 314).

Heap monitor 305, reasoning system 308 and communication technologies may serve as means for performing reification (306) to meta level 307, and means for performing reversion (311 and 312) to base level 301. Heap monitor 305 and reasoning system 308 could be implemented with JAVA, and could communicate with other components through web services technologies: hypertext transfer protocol (HTTP), extensible markup language (XML) and simple object access protocol (SOAP). Implementations for these web services technologies are freely available through the open-source software community. The reasoning system 308 may for example receive a reification message 306 in the form of an XML document, and parse the XML document. Other options for transmitting messages are message-oriented middleware (such as software products sold under the trademark MQSERIES by IBM) or secure hypertext transfer protocol (HTTPS).

Reasoning system 308 and rules 310 serve as means for performing introspection at the meta level, in response to the reification 306. Reasoning system 308 and rules 310 serve as means for applying one or more rules to the data provided by reification 306. Rules 310 may include knowledge of base-level computational components such as program 302, heap 304, and off-line storage 314, at the base level 301. Reasoning system 308 could be implemented as a rule-based expert system, that will allow the use of rules and policies (310) through a link (309) that can be incorporated as part of the meta level, or in a separate space. This implementation detail may be based on the need for business analysts rather than programmers to update these rules, for example. Database management software could be used, such as software products sold under the trademarks DB2 (by IBM), ORACLE, INFORMIX, SYBASE, MYSQL, Microsoft Corporation's SQL SERVER, or similar software. Reasoning system 308 and rules 310 may be incorporated into one computer system, or these components may be incorporated into separate computer systems independent of, but accessible to, one another. Arrow 309 shows communication between reasoning system 308 and rules 310. Reasoning system 308 and rules 310 serve as means for applying rules for control of one or more components, such as program 302, heap 304, and off-line storage 314, at the base level 301.

Heap monitor 305 is an example of means for detecting an error in a production environment. It may be implemented as a separate component, or as part of the program 302, to monitor the heap. This monitor 305 could be an elaborate system in its own right, or could be as simple as using the catch and throw exception-handling mechanism found in modern programming language such as JAVA. Other monitors could also be implemented to detect other kinds of application failures. Other monitors for other application failures may be incorporated into the application 302. Another reasoning process, or the same reasoning process 308, on the meta level 307 may handle other error conditions as they arise. Program 302 and heap 304 comprise means for implementing at the base level 301 a solution for the error (i.e. means for controlling the base-level computational components). Some approaches for implementation of means for detection and control are found in an article by J. P. Bigus et al., "ABLE: A Toolkit for Building Multiagent Autonomic Systems," *IBM Systems Journal*, Vol 41, no 3, p. 350 (2002). For example, the Bigus article contains a case study of a multiagent feedback control system for automatically tuning web server parameters. A feedback controller interacts with the web server to dynamically adjust the MaxClients and KeepAlive tuning parameters to meet desired processor and memory utilization levels. Bigus et al. also outline an architecture and methodology for building an autonomic agent capable of playing a role in an autonomic computing infrastructure, with sensors providing inputs from, and effectors providing outputs to the external components. The Agent Building and Learning Environment (ABLE) is a JAVA framework, component library, and tool kit, available to download at IBM's alphaworks web site.

Other approaches to implementation are found in a paper by IBM: *An Architectural Blueprint for Autonomic Computing* (2003). For example, the paper outlines approaches to implementing control loops. One example involves management tools using instrumentation interfaces such as a Simple Network Management Protocol management information base [SNMP MIB]. Another example involves embedding a loop in the runtime environment for a particular resource.

In conclusion, we have shown examples that reduce to a manageable level the complexity of automated error handling, recovery, problem-solving.

One of the possible implementations of the invention is an application, namely a set of instructions (program code) executed by a processor of a computer from a computer-usable medium such as a memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the method.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A method of handling errors, said method comprising:
   under control of a base level,
   detecting an error in a production environment;
   providing a reification message comprising data about said error to a rule-based expert system in a meta level, wherein the rule-based expert system in said meta level receives the reification message; analyzes said data, using knowledge of base-level computational components; chooses a self-healing action for said error; and returns a reversion message comprising a signal to implement the self-healing action; and
   responsive to receiving the signal at the base level, implementing said self-healing action at said base level,
   wherein the error is an out of memory condition; and
   wherein the production environment comprises a heap and wherein the self-healing action comprises at least one of reconstructing objects in the heap or storing objects from the heap that are not accessed frequently off-line.

2. The method of claim 1, further comprising:
   utilizing said base level to perform computation in said production environment; and
   utilizing said meta level to perform computation concerning behavior of said base-level computational components.

3. The method of claim 1, wherein said analyzing further comprises:
   applying at least one rule to said data.

4. The method of claim 1, wherein:
   said analyzing further comprises applying a rule for control of at least one component at said base level; and
   said implementing further comprises controlling said at least one component.

5. The method of claim 1, further comprising:
   implementing said base level and said meta level on the same computer.

6. The method of claim 1, further comprising:
implementing said base level and said meta level on separate computers.

7. The method of claim 1, further comprising:
implementing said base level on a plurality of computers.

8. The method of claim 1, wherein implementing said solution further comprises one or more actions chosen from
managing memory;
connecting to an alternative database;
terminating an application;
and starting an application.

9. The method of claim 1, wherein the production environment comprises an operating system and wherein the self-healing action comprises requesting more memory resources from the operating system.

10. A system of handling errors, said system comprising:
means for detecting an error in a production environment;
means for providing a reification message comprising data about the error to a rule-based expert system in a meta level;
means for performing introspection at said rule-based expert system, in response to said reification message, wherein the introspection uses knowledge of computational components of the production environment to identify a self-healing action for the error;
means for providing a reversion message from the rule-based expert system to the production environment, wherein the reversion message comprises a signal to implement the self-healing action; and
means for implementing the self-healing action at said production environment,
wherein the error is an out of memory condition; and
wherein the production environment comprises a heap and wherein the self-healing action comprises at least one of reconstructing objects in the heap or storing objects from the heap that are not accessed frequently off-line.

11. The system of claim 10, wherein said means for performing introspection further comprises:
means for applying at least one rule to said data.

12. The system of claim 10, wherein:
said means for performing introspection further comprises means for applying a rule for control of at least one component at said base level; and
said means for implementing further comprises means for controlling said at least one component.

13. The system of claim 10, further comprising:
means for implementing said base level and said meta level on the same computer;
wherein said meta level is a logical concept.

14. The system of claim 10, further comprising:
means for implementing said base level and said meta level on separate computers.

15. The system of claim 10, further comprising:
means for implementing said base level on a plurality of computers.

16. The system of claim 10, wherein said means for implementing further comprises means for performing one or more actions chosen from
managing memory;
connecting to an alternative database;
terminating an application;
and starting an application.

* * * * *